United States Patent Office 2,818,345
Patented Dec. 31, 1957

2,818,345

REFRACTORY CEMENT

Arthur Eric J. Vickers, Whickham, Newcastle, and John B. Maloney, Whitley Bay, England, assignors to Thermal Syndicate Ltd.

No Drawing. Application July 20, 1954
Serial No. 444,662

Claims priority, application Great Britain
October 24, 1951

10 Claims. (Cl. 106—57)

The present invention relates to refractory cements, and more particularly to novel refractory cements produced by the use of a new substance as a binder for the refractory cement.

The present application is a continuation-in-part of our copending application Serial No. 312,633, now abandoned, filed October 1, 1952, for "Refractory Cement."

In the case of powdered fused or calcined alumina, or mixtures of these, it is customary, in order to obtain a pure fired cement, to use an organic gum or adhesive which imparts strength to the body on air-drying. This air-dried, or "green," strength is only a temporary nature and is dissipated on decomposition of the particular gum or adhesive, leaving the resulting mass or article in a state of extreme friability during the stage between the decomposition of the gum or adhesive and the temperature at which incipient fusion takes place.

It is therefore a primary object of the present invention to provide a refractory composition utilizing a binder which gives adequate strength at and between the air-dried stage and the final fired or operating temperature.

It is a further object of the present invention to provide a binder which eliminates the undesirable stage in the formation of the final refractory during which the mechanical strength of the cement or article is low.

Other objects and advantages of the present invention will be apparent from a further reading of the specification and of the appended claims.

With the above objects in view, the present invention mainly comprises a new composition of matter adapted to be used as a refractory cement, comprising a refractory aggregate and aluminum chlorohydrate as binder.

Aluminum chlorohydrate is the commercial item containing aluminum, chlorine, oxygen and hydrogen which is generally sold throughout the United States and England as a solution in water and contains 23% $Al_2O_3$ equivalent to a solution of 50% of the dry solid. The chemical formula has been determined to be $Al_2(OH)_5Cl$.

The aluminum chlorohydrate may be utilized in the usual liquid form in which it is obtained in commerce or in solid dry form. When utilized in solid dry form, the solid aluminum chlorohydrate may be obtained by slowly evaporating the commercial liquid aluminum chlorohydrate to dryness and reducing the resulting vitreous product to a powder of the desired fineness. In evaporating the clear viscous liquid to dryness, care should be taken that a temperature is used which is below the temperature at which the chlorohydrate decomposes. The residue is a clear transparent glass, having a conchoidal fracture, and can be reduced to any degree of finess using well-known methods.

The use of aluminum chlorohydrate as a binder mixed with the refractory aggregate in suitable proportions gives adequate strength at and between the air-dried stage and the final firing or operating temperature and eliminates the undesirable stage during which the mechanical strength of the cement or article is low.

The refractory aggregate is preferably in powdered form, and most preferably in the form of a fine powder adapted to pass through a 150 mesh sieve, although of course powders of other varying degrees of fineness may be utilized with equally good results.

The present invention is applicable to the use of any refractory aggregate whatsoever, the aluminum chlorohydrate as binder improving the resulting product no matter what refractory is utilized. The most suitable refractories are the common inert refractory materials such as alumina, sillimanite, zirconia, zircon, magnesia, alumino-silicates and magnesia-aluminate-silicates.

In the case of a cement which consists of a powdered aggregate of fused or calcined alumina, or mixtures of these, to which has been added the desired proportion of aluminum chlorohydrate, the resultant mass or article, after firing, is an unadulterated alumina of high purity and nothing but alumina remains.

In the case of the alumino-silicates, the addition of aluminum chlorohydrate increases the alumina content and thereby leads to a body having a higher refractoriness.

The dry aluminum chlorohydrate may be added to the powdered refractory in any desired proportion and the constituents may be well mixed. Since the solid chlorohydrate is soluble in water, the consistency of the cement may be adjusted at will by the addition of a suitable quantity of water.

If so desired, the plasticity of the cement can be increased by the use of suitable water-soluble plasticizing agents in addition to the aluminum chlorohydrate.

It may also be desirable to increase the working properties of a mixture by the addition of a suitable proportion of a plastic clay in addition to the aluminum chlorohydrate.

As stated previously any suitable quantity of aluminum chlorohydrate may be utilized, though amounts of between 2–12% by weight are generally sufficient, preferably 3–9% being utilized and most preferably utilizing about 5% by weight of aluminum chlorohydrate.

The following examples are given as illustrative of the present invention, the scope of the invention not however being limited to the specific details of the examples.

Example 1

(a) A mixture is made of 75 parts of fused alumina in finely powdered form capable of passing through a 150 mesh sieve and 25 parts of dried alumina slip (made from calcined alumina) capable of passing through a 300 mesh sieve. This mixture is further mixed with powdered aluminum chlorohydrate capable of passing through a 60 mesh sieve in a ratio of 95% of the mixture to 5% of the aluminum chlorohydrate.

The formed mixture may be used as a refractory cement for the construction of furnaces or for repairing furnaces or parts of furnaces as well as for embedding or cementing refractory venturi nozzles and the like shapes into metal housings to protect such housings from the effect of high temperature and erosion. The cement may also be used for covering or embedding electrical resistance heating elements for protective purposes and for coating refractory tubes, such as pyrometer sheaths for protection in use against sudden changes in temperature, corrosion or erosion.

The formed composition may be applied as such or in the form of a paste obtained by mixing the composition with a small amount of water or some other liquid. Heat is then applied to the composition, e. g. a temperature of about 1200° C., to fuse the same to the object to which it is applied.

(b) A mixture is prepared consisting of 90 parts by weight of fused alumina capable of passing through a 60 mesh sieve and 10 parts by weight of ball clay. This mixture is further mixed with either solid aluminum chlorohydrate or a solution of aluminum chlorohydrate in water containing about 50% aluminum chlorohydrate, in a ratio of 95% of the mixture to 5% of aluminum chlorohydrate.

In the following examples additional compositions will be given which may be prepared utilizing either solid powdered aluminum chlorohydrate or the commercial solution of aluminum chlorohydrate in the same manner as above. The term "mesh" preceded by a number indicates that the material is capable of passing through a sieve having the stated number mesh. When preceded by two numbers, e. g. —90+150 it indicates that the material is capable of passing through a 90 mesh sieve and retained on a 150 mesh sieve. All parts are given by weight.

Example 2

Silica cement:

| | | |
|---|---|---|
| Crushed fused silica —90+150 mesh | parts | 100 |
| Powdered kaolin | do | 5 |
| Above mixture | percent | 91.3 |
| Aluminum chlorohydrate solid | do | 8.7 |

Example 3

Alumino-silicate cement:

| | | |
|---|---|---|
| Sillimanite —30 mesh | parts | 66.66 |
| Milled fused alumina —60 mesh | do | 25 |
| China clay | do | 4.166 |
| Ball clay | do | 4.166 |
| Above mixture | percent | 95 |
| Aluminum chlorohydrate solid —60 mesh | percent | 5 |

Example 4

Zirconia cement:

| | | |
|---|---|---|
| Fused stabilized zirconia —150 mesh | percent | 97 |
| Aluminum chlorohydrate solid —60 mesh | percent | 3 |

Example 5

Zirconium silicate cement:

| | | |
|---|---|---|
| Sintered zirconium silicate —60 mesh | parts | 75 |
| Zircon flour | do | 20 |
| Ball clay | do | 5 |
| Above mixture | percent | 95 |
| Aluminum chlorohydrate solid | do | 5 |

Example 6

Magnesia cement:

| | | |
|---|---|---|
| Fused magnesia —60 mesh | parts | 87.5 |
| Ball clay | do | 12.5 |
| Above mixture | percent | 97 |
| Aluminum chlorohydrate solid —60 mesh | percent | 3 |

As previously stated, liquid aluminum chlorohydrate may be substituted in equivalent amount for the solid aluminum chlorohydrate.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A new composition of matter adapted to be used as a refractory cement, said composition consisting essentially of 95 parts by weight of alumina as refractory aggregate and about 5 parts by weight of aluminum chlorohydrate as binder.

2. A new composition of matter adapted to be used as a refractory cement, said composition consisting essentially of a refractory aggregate and 2–12% by weight of aluminum chlorohydrate as binder.

3. A new composition of matter adapted to be used as a refractory cement, said composition consisting essentially of a refractory aggregate selected from the group consisting of alumina, sillimanite, zirconia, zircon, magnesia, alumino-silicates and magnesia-alumino-silicates, and 2–12% by weight of aluminum chlorohydrate as binder.

4. A new composition of matter adapted to be used as a refractory cement, said composition consisting essentially of alumina as refractory aggregate and 2–12% by weight of aluminum chlorohydrate as binder.

5. A new composition of matter adapted to be used as a refractory cement, said composition consisting essentially of a powdered refractory aggregate and 2–12% by weight of aluminum chlorohydrate as binder.

6. A new composition of matter adapted to be used as a refractory cement, said composition consisting essentially of a powdered refractory aggregate and 2–12% by weight of powdered aluminum chlorohydrate as binder.

7. A new composition of matter as claimed in claim 2 wherein the aluminum chlorohydrate is in the form of a solid.

8. A new composition of matter as claimed in claim 2 wherein the aluminum chlorohydrate is in the form of a liquid.

9. A new composition of matter as claimed in claim 3 wherein the aluminum chlorohydrate is in the form of a solid.

10. A new composition of matter as claimed in claim 3 wherein the aluminum chlorohydrate is in the form of a liquid.

References Cited in the file of this patent

UNITED STATES PATENTS 1,908,792    Ruben      May 16, 1933

OTHER REFERENCES

Mellor: Comprehensive Treatise on Inorganic and Theoretical Chemistry, v. 5, pp. 314, 315, 318 and 319; 1924.